Patented June 9, 1942

2,285,514

UNITED STATES PATENT OFFICE 2,285,514

MANUFACTURE OF METHYL CELLULOSE

Albert Aubrey Houghton and Charles Martin Taylor, Saltcoats, Scotland, assignors to Imperial Chemical Industries Limited, a corporation of Great Britain No Drawing. Application January 3, 1940, Serial No. 312,293. In Great Britain January 3, 1939

10 Claims. (Cl. 260—231)

The present invention relates to the manufacture of low-substituted methyl celluloses from cellulose, aqueous sodium hydroxide and dimethyl sulphate. The term "low-substituted" is used to describe ethers containing less, usually considerably less, than one methyl group per $C_6H_{10}O_5$ unit of cellulose.

Certain cellulose ethers which contain less than about one etherifying group per $C_6H_{10}O_5$ unit of cellulose are insoluble in water and organic solvents; but are swollen by, or more or less easily dissolved in dilute aqueous sodium hydroxide. As a rule, the lower the degree of etherification, the less easily is the cellulose ether brought into solution in dilute aqueous sodium hydroxide, but the more resistant it is to water when in the shape of films or coatings produced by coagulation of such a solution. Certain of these cellulose ethers have a degree of etherification so low that they will not form complete solutions in dilute aqueous sodium hydroxide under ordinary conditions but can only be dissolved by the application of special methods; for example, freezing or the methods described and claimed in British Patents Nos. 410,152 and 410,153. In recent years, this valuable property has aroused considerable interest in the low-substituted cellulose derivatives; and the desire for still higher water-resistance, and the discovery of special methods of dissolving in aqueous sodium hydroxide certain of these ethers not hitherto considered soluble in alkaline solutions, have aroused special interest in the ethers of a very much lower degree of substitution than one etherifying group per $C_6H_{10}O_5$.

An object of the present invention is the production of cellulose ethers whose degree of etherification is as low as is consistent with their complete solubility in aqueous sodium hydroxide, even with the aid of such special methods.

In the manufacture of low-substituted cellulose ethers from cellulose, aqueous caustic soda and etherifying agents of the inorganic ester type, the proportions of both etherifying agent and caustic soda present are greater than are theoretically necessary for the degree of etherification obtained. The caustic soda solution must be of mercerising concentration, e. g. about 18%; and even where the desired degree of etherification is as little as one-fourth or even one-sixth molar or less, it is in practice necessary to provide at least about one molar proportion of sodium hydroxide to every $C_6H_{10}O_5$ unit of cellulose. The etherifying agent is partly consumed by direct reaction with the caustic soda; and, in order to avoid undue wastage of the etherifying agent, any excess of caustic soda beyond the said minimum quantity should be somewhat limited, although it is necessary that the mixture should remain alkaline at the end of the reaction.

Cellulose is far more easily etherified in the initial stages than when the etherification has exceeded one ether group per $C_6$ unit; and in the production of a fractionally methylated product (which may be regarded as an assemblage of a large number of $C_6H_{10}O_5$ units of which only a few contain a methyl group) the methyl groups are more likely to be irregularly distributed at the lower stages of etherification. In view of what has been stated about the relation between the degree of etherification of a low-substituted cellulose ether and its solubility in aqueous caustic soda, it will be understood that a chemically heterogeneous product, even if more highly etherified than a more homogeneous ether whose average degree of etherification connotes solubility in aqueous caustic soda, may nevertheless fail to give a clear solution when dissolved therein by any known method.

In order to produce a regularly etherified product, a thorough admixture of the cellulose with the caustic alkaline solution, and a thorough distribution of the inorganic ester in the mixture, must be effected.

When inorganic esters of low reactivity are mixed with moist soda cellulose, no special difficulty arises. In such cases the necessary thorough admixture of the mercerising sodium hydroxide solution and the raw material cellulose, and the distribution of the inorganic ester throughout the soda cellulose, can be completed without any substantial danger of local excessive etherification.

In the case of dimethyl sulphate, however, homogeneous methyl ethers of cellulose are very difficult to obtain by the method outlined above. The insolubility of this compound as such in aqueous alkaline solutions, and the rapidity with which it reacts with soda cellulose (as shown by the rapid rise in temperature of its mixture with semi-moist soda cellulose) are causes which favour localised action and hinder the production of homogeneous methyl celluloses. Some improvement in this respect may be effected by the use of a volatile organic solvent for the dimethyl sulphate; but this adds to the expense of the process and introduces a fire risk into the manufacture, and is therefore undesirable.

A proposed manufacture of alkyl derivatives of cellulose that are soluble in alkali, but insoluble or only sparingly soluble in water, consists in acting upon cellulose without extraneous supply of heat with an alkylating agent, for instance dimethyl sulphate, in the presence of an amount of alkali smaller than the weight of water present. The alkali and the alkylating agent may be added to the cellulose simultaneously or successively in either order, and the alkylation may be performed while the reaction mass is being cooled. The alkylating agent may be employed either undiluted, or diluted with a suitable diluent; for example, benzol or the like.

Another proposed method for the production of methyl cellulose of the kind described consists in treating semi-moist soda cellulose at a temperature below 10° C. and preferably between 0° and 5° with dimethyl sulphate in amount substantially less than one molecular proportion for each $C_6H_{10}O_5$ unit of cellulose in the soda cellulose treated. At such temperatures the dimethyl sulphate is considerably less reactive, and the products obtained are better than those obtained by treating semi-moist soda cellulose with dimethyl sulphate at higher temperatures.

According to the present invention, the raw material cellulose is mechanically disintegrated in presence of a non-mercerising aqueous medium in which the total amount of water is considerably less than that required for the etherification and the dimethyl sulphate is simultaneously or subsequently mechanically distributed in the disintegrated cellulose; the mixture thereafter is treated with concentrated aqueous sodium hydroxide so that a mercerising concentration of sodium hydroxide is formed therein, and the methylation is carried out at a raised temperature. The distribution of the dimethyl sulphate is suitably effected at ordinary temperatures.

The raw material cellulose may be cotton linters, sulphite woodpulp, or shredded cellulose alpha pulp sheet or board. We prefer to use the so-called "dense cellulose" obtained by comminuting sulphite woodpulp sheet.

The mechanical disintegration of the cellulose in the restricted proportion of water may if necessary be assisted by the presence of a neutral or alkaline lubricating agent, for instance, glycerine, Turkey red oil, soap, a water-soluble cellulose ether, or even sodium hydroxide; but if sodium hydroxide is used its concentration must be considerably below that of mercerising strength, for example, 2% to 5%. If desired, the dimethyl sulphate may be mechanically distributed throughout the cellulose during the disintegration step. The amount of dimethyl sulphate should not exceed ½ mole; and may be very considerably less. We have obtained excellent results from using from ⅙ to ⅓ mole, and even smaller quantities. The addition of the concentrated aqueous sodium hydroxide is carried out with mechanical mixing, and causes a certain evolution of heat, and the reaction mass may, if desired, be externally heated so that a higher temperature may be maintained. The methylation is conveniently carried out at about 40° to 85° C. The concentration of this added sodium hydroxide solution may conveniently reach or exceed 40%, and if desired the solution may be used warm.

The methyl celluloses of the present invention may be soluble in dilute aqueous alkali under ordinary temperature conditions; or only after the application of cooling or other special measures. By applying such measures it is possible to make perfect solutions of cellulose ethers of a lower average degree of etherification than those produced by the hitherto known processes. Hence, the consumption of dimethyl sulphate may be reduced and useful ethers of higher viscosity or water resistance may be obtained. The viscosity of the products may be controlled by variation of the time for which the reaction mixture is maintained at the methylation temperature after the methylation of the cellulose has been completed. Usually the reaction is over, and the viscosity of the product has begun to fall, within about two hours from the commencement of the heating.

In comparison with the process in which the same quantities of cellulose and sodium hydroxide solution are mixed and comminuted and the etherifying agent is introduced into the comminuted soda cellulose at ordinary or raised temperature, the present invention has the advantage that considerably better products are obtained; and in comparison with a similar process in which the etherifying agent is caused to react with the moist soda cellulose at subnormal temperature, the present invention has the advantages that a shorter reaction time is required, and that heavier charges can be accommodated in the comminuting vessel.

The invention is further illustrated by the following examples, in which the parts are parts by weight.

Example 1

125 parts sulphite woodpulp sheet containing about 8% moisture, and 110 parts alpha cellulose cut into squares of about ⅛" size are shredded for 16 hours in a Werner Pfleiderer incorporating machine with 150 parts of 5% sodium hydroxide, the temperature being kept at approximately 20° C. by means of a cooling jacket. Towards the ends of this period 21 parts of dimethyl sulphate are added, and the action of the machine is kept up for at least an hour after all the dimethyl sulphate has been introduced. Thereupon the cooling is discontinued, and 75 parts of a solution of equal weights of sodium hydroxide and water are gradually introduced over a period of one hour while the machine is still running, and after this addition the machine is kept running for a further hour. The contents of the machine are then spread out on open trays in a room maintained at a temperature of 60° C. for 16 hours. The reaction mixture is then thoroughly mixed into a bath containing an excess of 4% sulphuric acid, and the acidified methyl cellulose is centrifuged and washed with water until free from acidity. A solution is made up by subjecting a mixture containing 7 parts dry weight of the product, 7 parts sodium hydroxide and 86 parts water to refrigeration to −7° C. and allowing the partially frozen mixture to rise to room temperature again. An excellent solution practically free from fibrous and suitable for the manufacture of films or cloth-filling is obtained. The textile dressings obtained are of excellent fastness to washing and laundering.

Example 2

The procedure differs from that of Example 1 in that immediately after the addition of the 75 parts of 50% sodium hydroxide solution, steam is introduced into the jacket of the Werner Pfleiderer incorporating machine, and the temperature is raised to 70° C., the machine being kept running at about this temperature for 3 hours and the reaction mixture being acidified immediately thereafter. The product is very similar to that obtained according to Example 1.

*Example 3*

The procedure is generally similar to that described in Example 2 except that 16.8 parts of dimethyl sulphate are employed, and the concentrated sodium hydroxide used is a solution containing 37½ parts sodium hydroxide and 41½ parts water. The heating is carried out at 80° C. for 2 hours. The methyl cellulose obtained yields a solution of higher viscosity than those of Examples 1 and 2 made up in the same way. This solution develops gelatinous properties after standing at 20° C. for several hours, but may be used for textile applications almost indefinitely. A solution made up in 7% sodium hydroxide containing in solution 1.2% zinc oxide, in a similar manner and also containing 7% of its weight of the product, however, does not develop gelatinous properties on long standing and is also of excellent quality.

*Example 4*

125 parts of the same raw material cellulose as in the preceding examples are shredded with 56 parts of water and 84 parts of a 5% solution of a water-soluble methyl cellulose for 16 hours at a temperature somewhat below 25° C. 21 parts of dimethyl sulphate are added as in the preceding examples and thereafter a hot solution of 45 parts sodium hydroxide in 40 parts water is added slowly while the machine is still running. The steam is turned on, heating is continued for 3 to 4 hours at 60 to 70° C. The reaction mixture is then acidified. The methyl cellulose yields solutions of excellent quality and stability when made up according to the method of Example 1.

*Example 5*

According to this example the procedure is similar to that of Example 4 except that 140 parts of a 5% solution of soap in water are used for shredding the cellulose instead of the aqueous methyl cellulose solution.

*Example 6*

The procedure is the same as in Example 5 except that the solution with which the woodpulp is shredded consists of a mixture of 56 parts water and 5 parts Turkey red oil, and the concentrated sodium hydroxide solution subsequently added after the introduction of the dimethyl sulphate is made from 45 parts sodium hydroxide and 119 parts water. The methyl celluloses obtained according to Examples 5 and 6 are of excellent quality.

*Example 7*

125 parts of the woodpulp used according to the preceding examples are shredded for 16 hours with 28 parts water, 5 parts glycerine and 21 parts dimethyl sulphate, the last mentioned ingredient being introduced along with the water and glycerine. There is introduced a solution of 45 parts sodium hydroxide in 147 parts water, the mixture being heated thereafter for 3 hours to a temperature of 60 to 70° C.

*Example 8*

The raw material cellulose and the procedure are as in Example 3, but the quantity of dimethyl sulphate is only 12.6 parts. The concentrated sodium hydroxide solution used contains 37.5 parts sodium hydroxide and 46 parts water.

The methyl cellulose solution made up as described in Example 1 develops strongly gelatinous properties within about 1 hours on standing at 20° C., but may be employed for textile applications in which only slightly penetrating coatings are desired.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of low substituted methyl celluloses from cellulose aqueous sodium hydroxide and dimethyl sulfate which comprises both mechanically disintegrating the raw material cellulose and mechanically distributing the dimethyl sulfate therein in contact with a non-mercerising aqueous caustic soda of 2% to 5% strength and thereafter mercerising the cellulose by the addition of concentrated aqueous sodium hydroxide and then permitting the methylation to proceed.

2. A process as claimed in claim 1 in which external heating is applied to the reaction mass during etherification.

3. A process as claimed in claim 1 in which the lubricating agent is a water soluble cellulose ether.

4. Process for the manufacture of low substituted methyl cellulose from cellulose, aqueous caustic alkali and dimethyl sulfate which comprises both mechanically disintegrating the cellulosic raw material and mechanically distributing the dimethyl sulfate therein, in contact with aqueous caustic alkali of 2% to 5% concentration, and thereafter mercerizing the cellulose by the addition of sufficient concentrated aqueous caustic alkali to yield, with the caustic alkali present, caustic alkali of mercerizing strength, and then permitting the methylation to proceed.

5. Process for the manufacture of low substituted methyl cellulose from cellulose, aqueous caustic alkali and dimethyl sulfate which comprises mechanically disintegrating the cellulosic raw material in contact with aqueous caustic alkali of 2% to 5% concentration, mechanically distributing the dimethyl sulfate therein, and thereafter mercerizing the cellulose by the addition of sufficient concentrated aqueous caustic alkali to yield, with the caustic alkali present, caustic alkali of mercerizing strength, and then permitting the methylation to proceed.

6. Process for the manufacture of low substituted methyl cellulose from cellulose, aqueous caustic alkali and ⅙ to ½ mol dimethyl sulfate (based on the cellulose), which comprises both mechanically disintegrating the cellulosic raw material and mechanically distributing the dimethyl sulfate therein, in contact with aqueous caustic alkali of 2% to 5% concentration, and thereafter mercerizing the cellulose by the addition of sufficient concentrated aqueous caustic alkali to yield, with the caustic alkali present, caustic alkali of mercerizing strength, and then permitting the methylation to proceed.

7. The process which comprises mechanically disintegrating cellulosic raw material and mechanically distributing dimethyl sulfate in the disintegrated cellulose in contact with non-mercerising aqueous caustic alkali in which the total amount of water is less than that required for methylation, adding concentrated aqueous caustic alkali so that a mercerizing concentration of aqueous caustic alkali is formed in the disintegrated mass, and raising the temperature within the range 40°-85° C. until methylation has been carried out.

8. The process which comprises shredding in a Werner-Pfleiderer shredder 125 parts of sulfite wood pulp sheet containing about 8% moisture for 16 hours in contact with 150 parts of 5% aqueous sodium hydroxide while maintaining a temperature of 20° C., adding near the end of this period 21 parts of dimethyl sulfate, and continuing the shredding action for at least an hour after the dimethyl sulfate addition, continuing the shredding operation allowing the temperature to rise from the heat of the reaction while adding 75 parts of 50% aqueous sodium hydroxide over a period of one hour, continuing the disintegrating action for at least one hour after the addition of the concentrated aqueous sodium hydroxide, and thereafter ageing the reaction mass while spread in open trays maintained at 60° C. for 16 hours.

9. Process for the manufacture of low substituted methyl cellulose from cellulose, aqueous caustic alkali and dimethyl sulfate which comprises mechanically disintegrating the cellulosic raw material and simultaneously mechanically distributing the dimethyl sulfate therein, in contact with aqueous caustic alkali of 2% to 5% concentration, and thereafter mercerizing the cellulose by the addition of sufficient concentrated aqueous caustic alkali to yield, with the caustic alkali present, caustic alkali of mercerizing strength, and then permitting the methylation to proceed.

10. The process which comprises mechanically disintegrating cellulosic raw material and simultaneously mechanically distributing dimethyl sulfate in the disintegrated cellulose in contact with non-mercerizing aqueous caustic alkali in which the total amount of water is less than that required for methylation, adding concentrated aqueous caustic alkali so that a mercerizing concentration of aqueous caustic alkali is formed in the disintegrated mass, and raising the temperature within the range 40°-85° C. until methylation has been carried out.

ALBERT A. HOUGHTON.
CHARLES M. TAYLOR.